United States Patent
Lucas et al.

(10) Patent No.: US 8,135,840 B2
(45) Date of Patent: Mar. 13, 2012

(54) SYSTEMS AND METHODS FOR DIRECTING CONTENT REQUESTS TO SERVERS

(75) Inventors: John F. Lucas, Tinton Falls, NJ (US);
Alan Glasser, Manalapan, NJ (US);
Andrew G. Gauld, Middletown, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 273 days.

(21) Appl. No.: 12/274,526

(22) Filed: Nov. 20, 2008

(65) Prior Publication Data

US 2010/0125626 A1 May 20, 2010

(51) Int. Cl.
*G06F 15/173* (2006.01)
(52) U.S. Cl. ........ 709/226; 709/202; 709/203; 709/205; 709/217; 709/218; 709/219; 709/227; 709/238
(58) Field of Classification Search .................. 709/229, 709/230, 231, 202, 203, 205, 217–219, 226, 709/227, 238
See application file for complete search history.

(56) References Cited

U.S. PATENT DOCUMENTS

| | | | |
|---|---|---|---|
| 6,097,957 A * | 8/2000 | Bonta et al. | 455/446 |
| 6,490,615 B1 * | 12/2002 | Dias et al. | 709/219 |
| 6,549,781 B1 * | 4/2003 | O'Byrne et al. | 455/446 |
| 6,671,259 B1 * | 12/2003 | He et al. | 370/238 |
| 7,072,979 B1 | 7/2006 | Aviani, Jr. et al. | |
| 7,343,399 B2 * | 3/2008 | Hayball et al. | 709/219 |
| 2002/0049857 A1 | 4/2002 | Farber et al. | |
| 2004/0022194 A1 | 2/2004 | Ricciulli | |
| 2005/0100027 A1 | 5/2005 | Leinwand et al. | |
| 2005/0114296 A1 | 5/2005 | Farber et al. | |
| 2006/0015574 A1 | 1/2006 | Seed et al. | |
| 2009/0094374 A1 * | 4/2009 | Lam et al. | 709/231 |
| 2010/0093438 A1 * | 4/2010 | Baszucki et al. | 463/42 |

* cited by examiner

Primary Examiner — Liangche A Wang
(74) Attorney, Agent, or Firm — Larson Newman, LLP

(57) ABSTRACT

A method of delivering content to a client includes receiving a request for the content from the client at a first server, determining the size of the content, and determining an optimal server to provide the content. The method further includes redirecting the client to the optimal server when the size of the content is above a threshold.

17 Claims, 7 Drawing Sheets

SYSTEMS AND METHODS FOR DIRECTING CONTENT REQUESTS TO SERVERS

FIELD OF THE DISCLOSURE

The present disclosure generally relates to communications networks, and more particularly relates to systems and methods for directing content requests to servers.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to an edge server situated closer to the client issuing the request. CDNs either co-locate edge servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
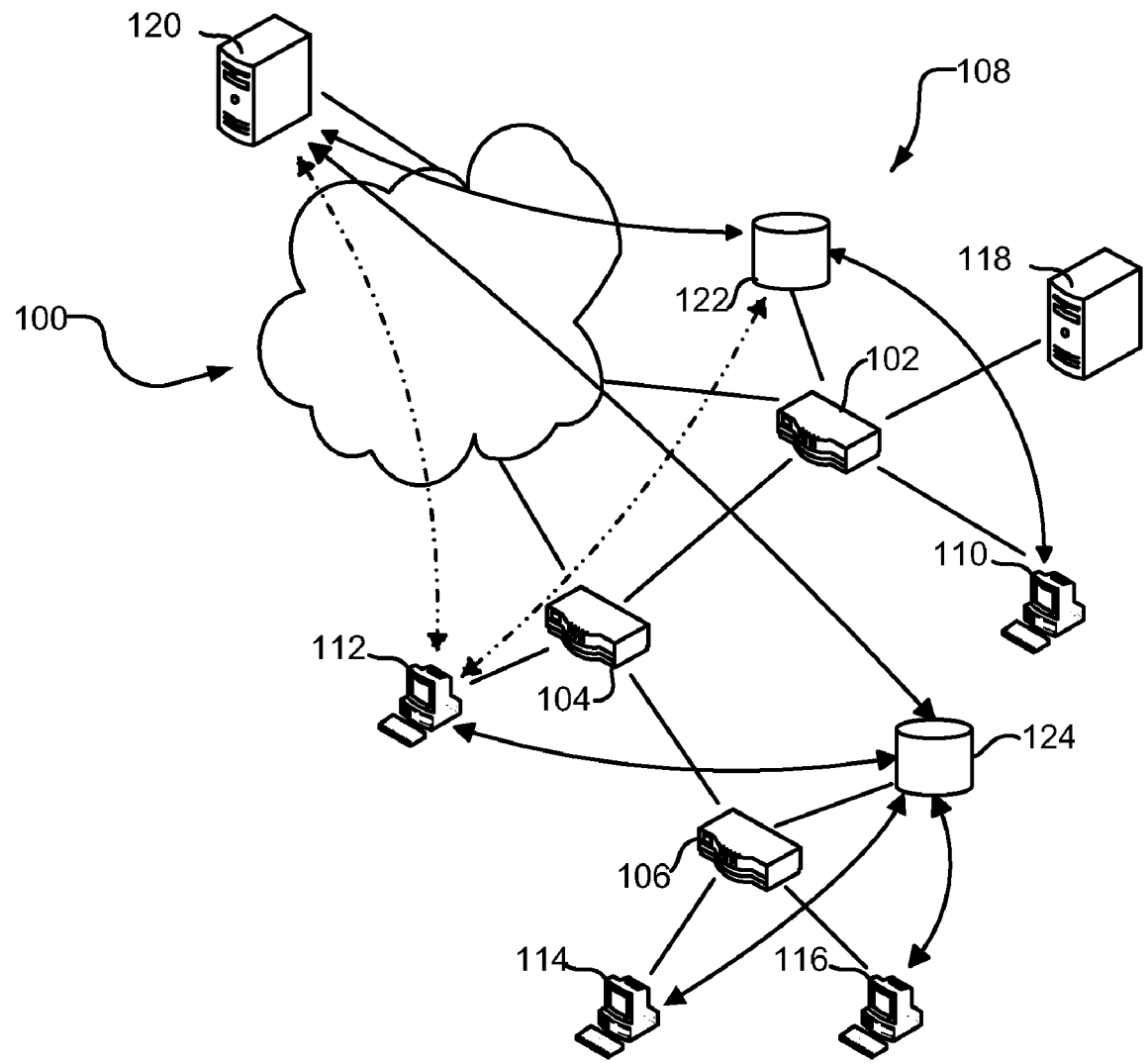
FIG. 1 is a diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphic, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include edge servers 122 and 124 replicating content on the server 120 that can be located more closely within the network to the client systems 110, 112, 114, and 116. Edge server 122 can link to router 102, and edge server 124 can link to router 106. Client systems 110, 112, 114, and 116 can be assigned edge server 122 or 124 to decrease the time needed to retrieve information, such as by selecting the edge server closer to the particular client system. The distance between a edge server and client system can be determined by the network cost and access time. As such, the distance between the edge server and the client system may be different from the geographic distance.

When assigning edge servers 122 and 124 to client systems 110 through 116, the edge server closest to the client can be selected. The closest edge server may be the edge server having a shortest network distance, a lowest network cost, a lowest network latency (time to delivery of the first byte), a highest link capacity, or any combination thereof. Client system 110 can be assigned edge server 122, and client systems 114 and 116 can be assigned to edge server 124. The network costs of assigning client system 112 to either of edge server 122 or 124 may be substantially identical. When the network costs associated with the link between router 102 and router 104 are marginally lower than the network costs associated with the link between router 104 and router 106, client 112 may be assigned to edge server 124.

Client system 112 may send a request for information to edge server 124. If edge server 124 has the information stored in a cache, it can provide the information to client system 112. This can decrease the distance the information travels and reduce the time to retrieve the information. Alternatively, when edge server 124 does not have the information, it can retrieve the information from server 120 prior to providing the information to the client system 112. In an embodiment, edge server 124 may attempt to retrieve the information from edge server 122 prior to retrieving the information from server 120. The edge server 124 may retrieve the information from the server 120 only once, reducing the load on server 120 and network 100 such as, for example, when client system 114 requests the same information.

Figure 2:
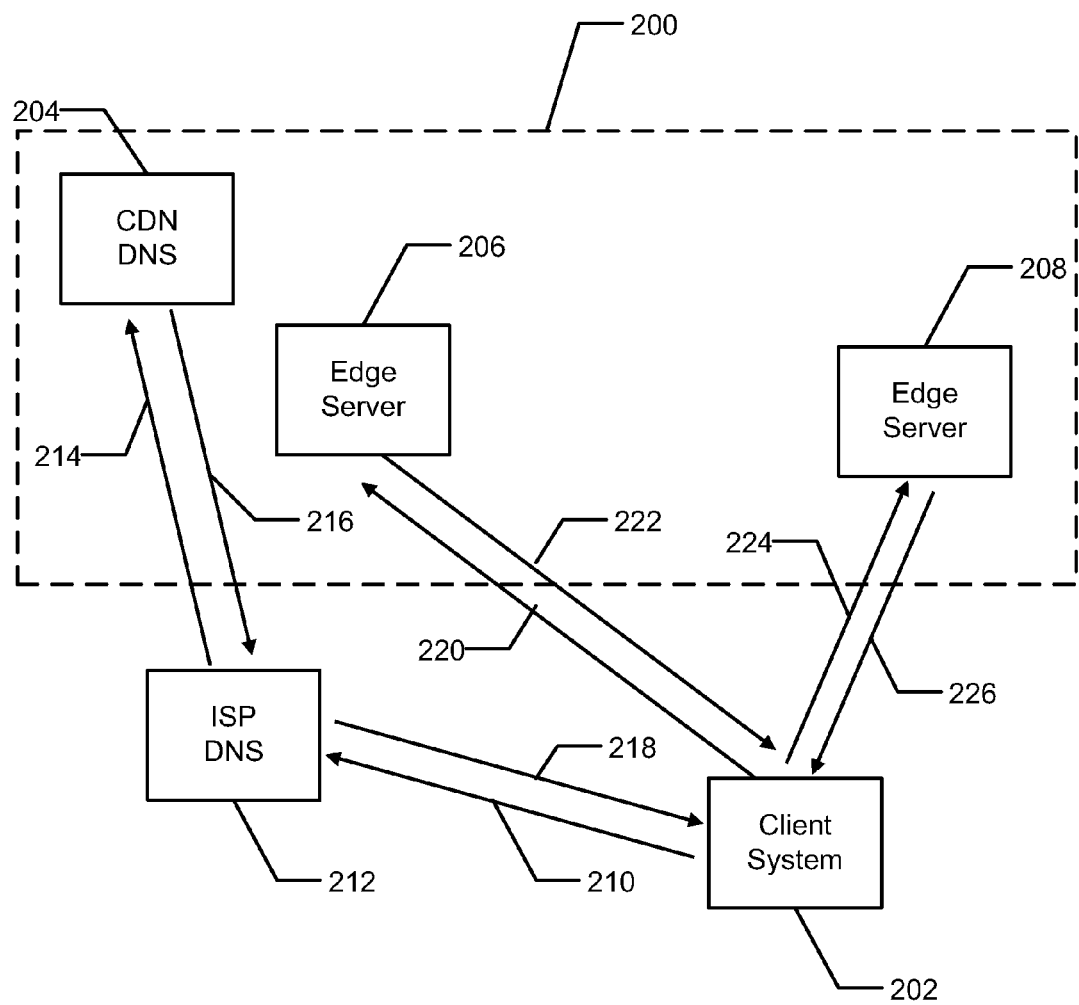
FIG. 2 is diagram illustrating a CDN in accordance with one embodiment of the present disclosure.

FIG. 2 shows an exemplary CDN system 200 for providing content to client system 202. The CDN system 200 can include a CDN DNS server 204 and edge servers 206 and 208. Client system 202 can send a request 210 to an Internet Service Provider (ISP)DNS server 212 to obtain an IP address corresponding to a hostname portion of a Uniform Resource Locator (URL). The URL can correspond to content that can be served by edge servers 206 and 208. When the ISP DNS 212 does not have the IP address cached, the ISP DNS 212 can send a request 214 to the CDN DNS 204. The CDN DNS 204 can attempt to determine which of edge servers 206 and 208 is closer to the client system 202. However, the request 214 received by the CDN DNS 204 may have an originating IP address of the ISP DNS 212. Based on the IP address of the ISP DNS 212, the CDN DNS 204 may determine that edge server 206 is likely to be closer and provide content more efficiently to client system 202. CDN DNS 204 can send a reply 216 to the ISP DNS 212 including the IP address of edge server 206. ISP DNS 212 can send a reply 218 to client system 202 including the IP address of edge server 206 received from CDN DNS 204.

Upon receipt of the reply 218, client system 202 can send a request 220 for the content to edge server 206. Edge server 206 can determine, based on the IP address of client system 202, that edge server 208 is closer and can provide content more efficiently to client system 202. Edge server 206 can send a reply 222 to client system 202 to redirect client system 202 to edge server 208. Upon receipt of reply 222, client system 202 can send a request 224 for the content to edge server 208. Edge server 208 can provide the content to client system 202 in a reply 226. In an embodiment, redirecting client system 202 from edge server 206 to edge server 208 can require a non-trivial amount of time, including the time required for client system 202 to receive reply 222 from edge server 206 redirecting client system 202 and the time required for client system 202 to establish a connection with edge server 208 and request the content from edge server 208. As such, redirecting client system 202 may be efficient only for content larger than a threshold file size.

In another embodiment, the client system may receive an IP address for a redirecting server from the ISP DNS server. The redirecting server may utilize the IP address of the client system to redirect the client system to the optimal edge server. The redirecting server may not cache the content and may not be able to provide the content to the client system without redirecting the client system to the optimal edge server.

Figure 3:
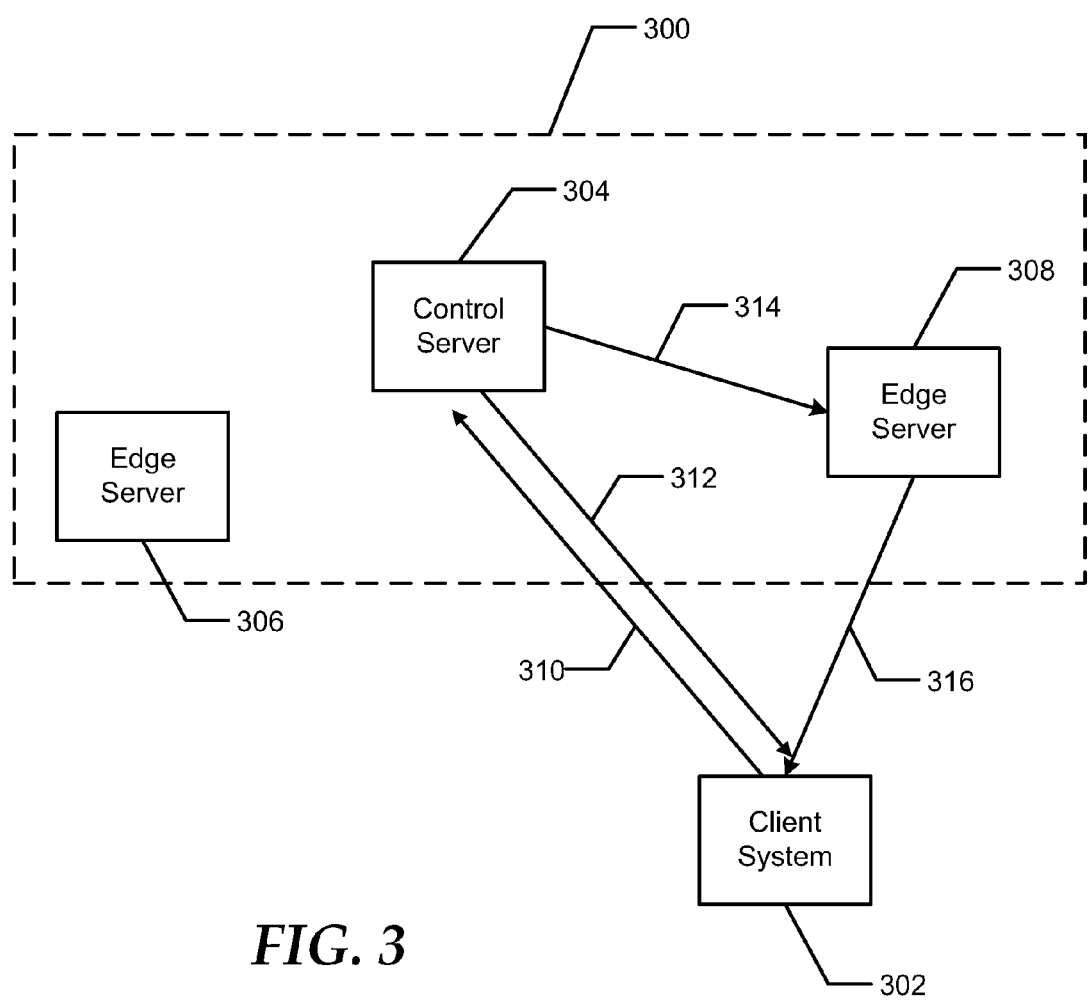
FIG. 3 is diagram illustrating a CDN in accordance with one embodiment of the present disclosure.

FIG. 3 shows another exemplary CDN system 300 for providing content to client system 302. CDN system 300 can be particularly suited for the delivery of streamed audio and video content. The CDN system 300 can include a control server 304, an edge server 306, and an edge server 308. The control server 304 can receive requests for content, which can be stored at edge servers 306 and 308. Edge servers 306 and 308, under the control of control server 304, can provide the content to client systems, such as client system 302. Client system 302 can send a request 310 for the content to the control server 304. Control server 304 can determine, based on the IP address of client system 302, that edge server 308 is the optimal server for providing content to client system 302. Control server 304 can send a response 312 to client system 302 signaling that the requested content will be delivered from edge server 308. Control server 304 can send a command 314 to edge server 308 instructing edge server 308 to send the content to client system 302. Edge server 308 can set up a content delivery session 316 with client system 302 and deliver the content.

Figure 4:
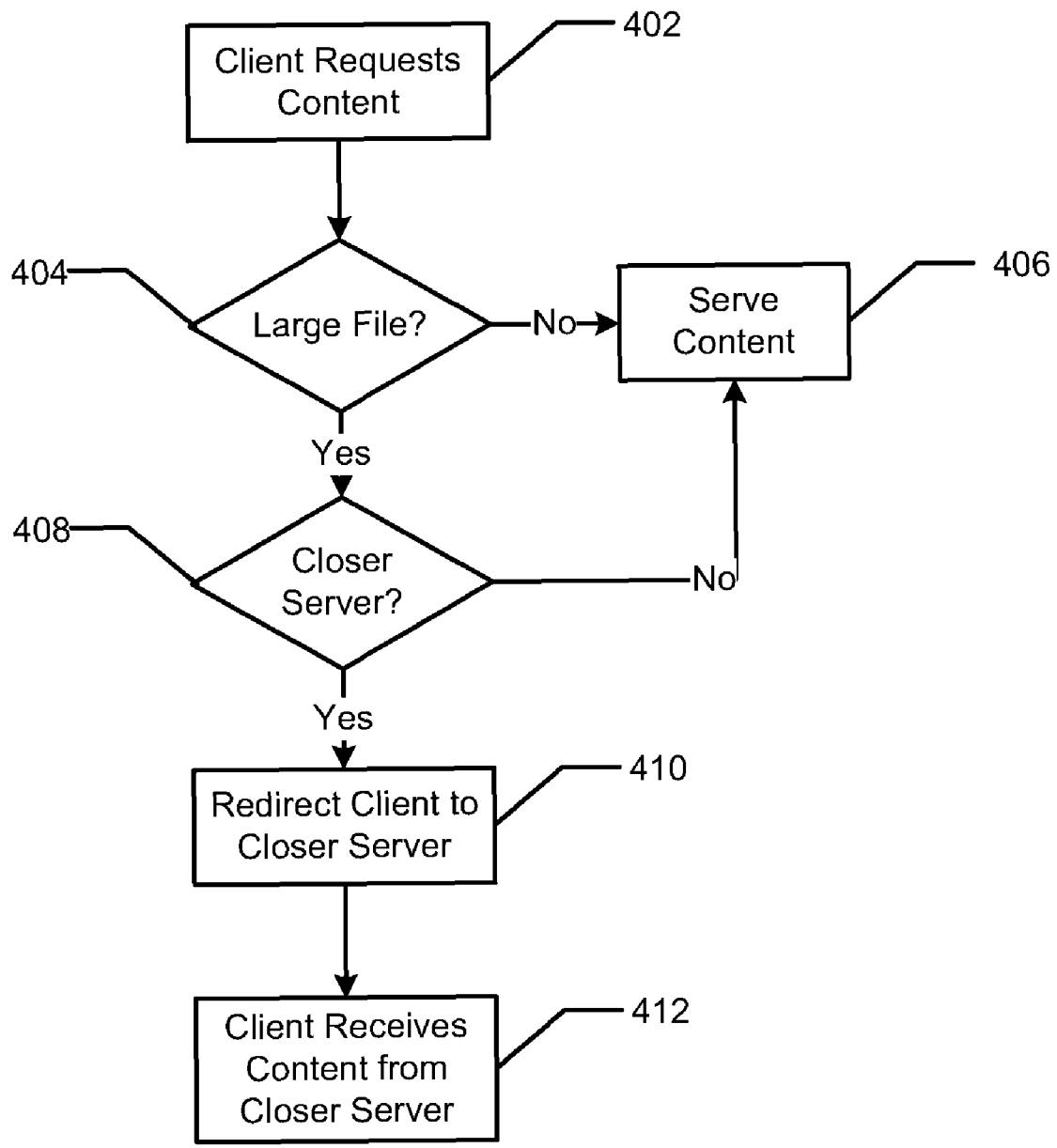
FIG. 4 is a flow diagram illustrating a method of distributing content to a client system in accordance with one embodiment of the present disclosure.

FIG. 4 illustrates a method of delivering content. At 402, a client system, such as client system 112, can request content from a first edge server, such as edge server 122. The request can include the identity of the content. For example, a hypertext transfer protocol (HTTP) request can identify the content based on the hostname and/or the path of the URL. At 404, the first edge server can determine if the requested content is a large file. The time required for the client system to establish a connection to and receive the content from an optimal edge server can be significantly less than the time required to transfer a large file from the first edge server. However, for a small file, the time required to establish a connection to and receive the content from the optimal edge server can be similar to or greater than the time required to transfer the file from the first edge server. When the first edge server determines the file is not large, such as a file having a size less than a threshold size, the first edge server can serve the content to the client system, as illustrated at 406.

In an alternate embodiment, when the first edge server determines that the file is not large, the first edge server may additionally notify the client system of the IP address of the optimal edge server. The client system may request additional content directly from the optimal edge server using the IP address rather than continuing to request content from the first edge server.

Alternatively, when the first edge server determines that the file is a large file, the first edge server can determine if there is an optimal edge server that is closer to the client system. The IP address of the client system can be used to determine the location of the client system within the network. The location can be used to determine the optimal edge server that is closest to the client system, such as the optimal edge server that minimizes the network cost, the time to deliver a file, or any combination thereof. For example, the first edge server may utilize a table associating client IP addresses with optimal edge servers. When the first edge server cannot find an optimal edge server that is closer to the client system, then the first edge server can serve the content to the client system, as illustrated at 406.

Alternatively, when the first edge server can find an optimal edge server that is closer to the client system, the first edge server can send a response to the client system redirecting the client system to the optimal edge server, as illustrated at 410. At 412, the client system can send a request to the optimal edge server and receive the content from the optimal edge server.

In an exemplary embodiment, the first edge server can calculate the savings from delivering the content from the optimal edge server and compare the savings to the cost of redirecting the client system to the optimal edge server. For example, based on a difference in the network distance and the amount of network congestion between the first edge server and the client system and the optimal edge server and the client system, the first edge server can calculate a difference in the time required to deliver the content from the first edge server and from the optimal edge server. When the savings is not greater than the cost of redirecting the client system to the optimal edge server, the first edge server can deliver the content. Otherwise, the first edge server can redirect the client system to the optimal edge server.

Figure 5:
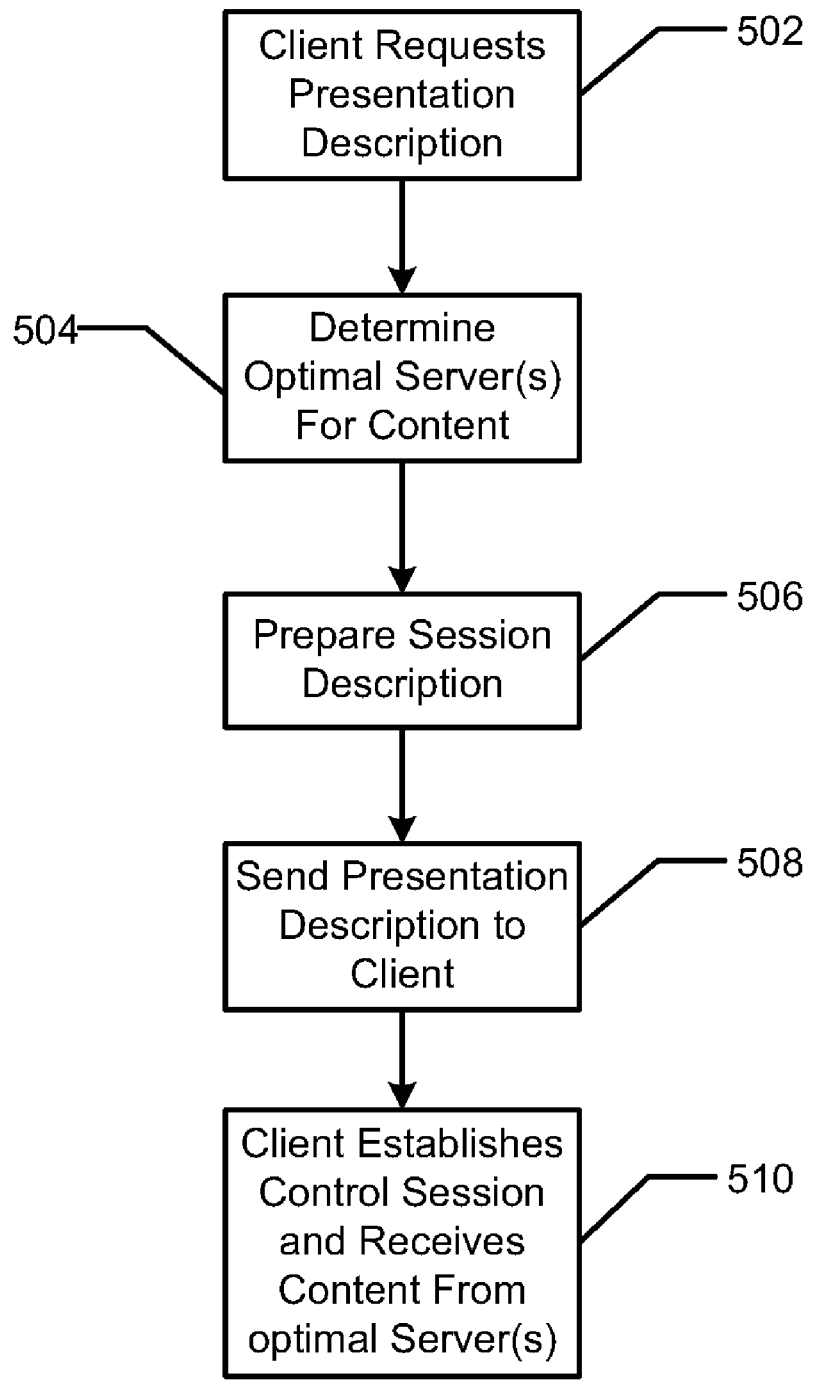
FIG. 5 is a flow diagram illustrating another method of distributing content to a client system in accordance with one embodiment of the present disclosure.

FIG. 5 illustrates another exemplary method of delivering content to a client system, such as client system 112. The content can be media content, such as an audio-video presentation, delivered using a control protocol such as Real-Time Streaming Protocol (RTSP). At 502, the client system can request a presentation description from a server, such as server 120. At 504, the server can determine, based on the IP address of the client system, the optimal server to deliver the media content to the client system. The optimal server can be the server that has a lower network cost, a lower latency to the client system, a shorter time to deliver the content to the client system, a greater available capacity, or any combination thereof. In an embodiment, when the content consists of multiple independent streams, the server can identify an optimal server to provide each independent stream. At 506, the server can prepare a presentation description that will direct the client system to retrieve the content from the optimal server determined at 504. At 508, the server can respond to the client system with the presentation description. At 510, the client system can use the information in the presentation description to establish a media control session and to prepare to receive media content from the optimal server.

Figure 6:
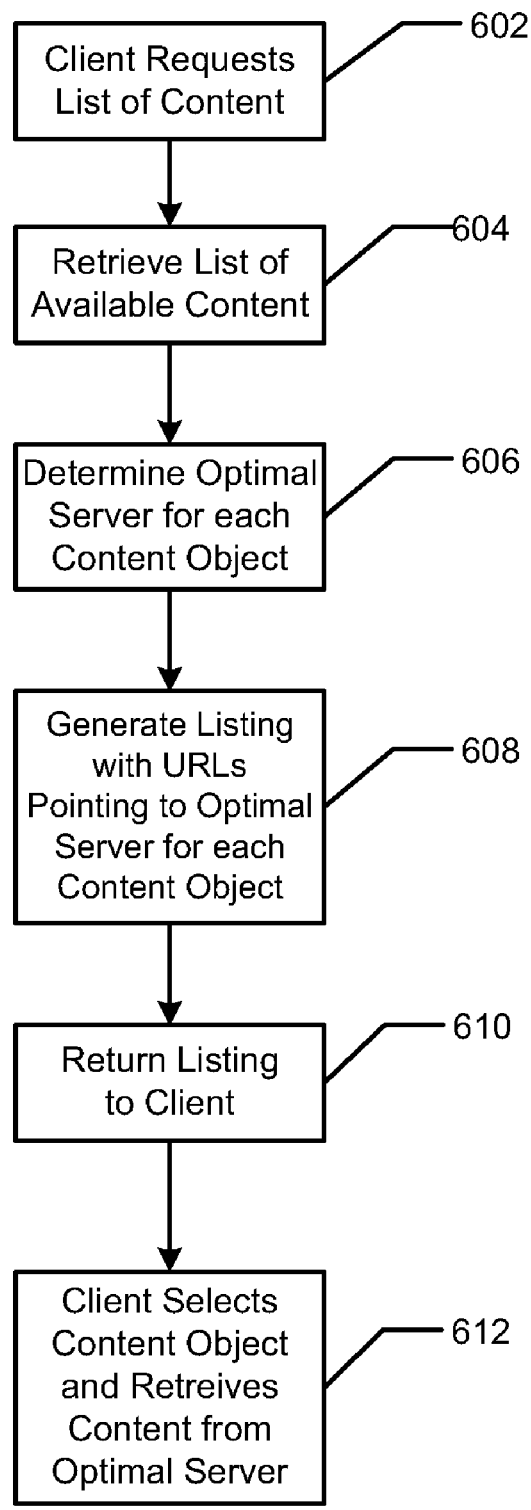
FIG. 6 is a flow diagram illustrating another method of distributing content to a client system in accordance with one embodiment of the present disclosure.

FIG. 6 illustrates another exemplary method of delivering content to a client system, such as client system 112. At 602, the client system can request a listing of available content from a server, such as server 122. At 604, the server can retrieve a list of available content. At 606, the server can determine, based on the IP address of the client system, the optimal edge server for delivering each of the available content objects to the client system. The optimal edge server for each content object can be the edge server that has a lower network cost to deliver the content object to the client system, a shorter time to deliver the first byte to the client system, a shorter time to deliver the content object to the client system, or any combination thereof. Additionally, the optimal edge server can be an edge server having the content object instead of needing to retrieve the content from another server. In an embodiment, different content objects may have different optimal edge servers. At 608, the server can construct the listing of the available content and embed URLs to each of the available content objects that identify the optimal edge server for that content item. For example, the embedded URLs can be modified by replacing the hostname with an IP address of the optimal edge server for the content object. Alternatively, the hostname can be changed to a hostname specific for the optimal edge server for that content object. At 610, the server can provide the listing, such as in a web page, to the client system. At 612, the client system can select a content object from the listing and retrieve the selected content item from the optimal edge server.

In an alternate embodiment, the server can encode at least a portion of the IP address of the client system within the hostname. For example, the server can incorporate the IP address information into the hostname, such as by changing www.cdn.com to www.123-456-789.cdn.com or 123456789.www.cdn.com. In another example, the IP address information may be encrypted and the encrypted information can be incorporated into the hostname. When the client system attempts to retrieve the embedded content, a DNS server can identify the optimal edge server based on the IP address information embedded in the hostname. In this way, the server may not require the ability to identify the optimal server or access to the information used to identify the optimal server.

Figure 7:
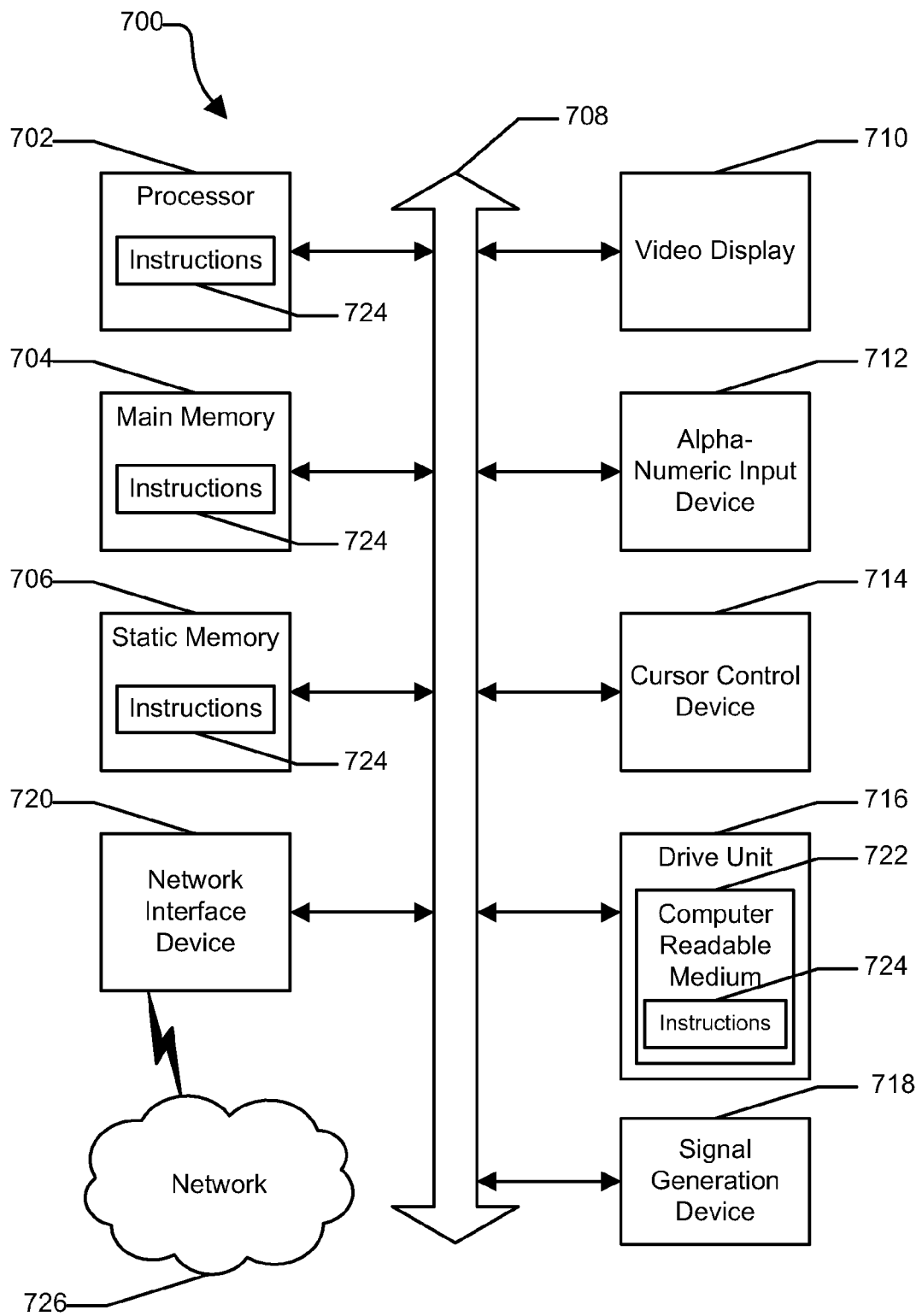
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A non-transitory computer readable medium comprising a plurality of instructions to manipulate a processor, the plurality of instructions comprising:
   instructions to receive a request for content from a client at a first server, wherein the content comprises a plurality of independent streams;
   instructions to determine the size of the content associated with each one of the plurality of independent streams;
   instructions to determine a plurality of optimal servers to provide each one of the plurality of independent streams, wherein each server of the plurality of optimal servers is determined as being closer to the client than the first server based upon a table associating an Internet Protocol address of the client with the optimal servers;
   instructions to prepare a presentation description for the content associated with each one of the independent streams, each presentation description including information for the client to establish a media control session for the respective content;
   instructions to provide the presentation descriptions to the client; and
   instructions to redirect the client to each one of the plurality of optimal servers when the size of the independent stream provided by each one of the plurality of optimal servers is above a threshold.

2. The computer readable medium of claim 1 wherein each one of the plurality of optimal servers has a greater capacity to deliver the content to the client as compared to the first server.

3. The computer readable medium of claim 1 wherein each one of the plurality of optimal servers delivers a first byte of the content in a shorter amount of time as compared to the first server.

4. The computer readable medium of claim 1 wherein the threshold is a file size above which redirecting the client to receive the content from each one of the plurality of optimal servers is more efficient than delivering the content from the first server.

5. The computer readable medium of claim 1 wherein each one of the optimal servers has a lower network cost to deliver the content to the client as compared to the first server.

6. The computer readable medium of claim 1 wherein each one of the optimal servers delivers the content to the client in a shorter amount of time as compared to the first server.

7. A method of delivering content to a client, comprising:
   receiving a request for a content listing from the client at a first server, wherein the content listing comprises a plurality of independent streams;
   determining the size of the content associated with each one of the plurality of independent streams;
   determining a plurality of optimal servers for providing each one of the plurality of independent streams to the client, each server of the plurality of optimal servers being determined as a closer server than the first server based on a table associating an Internet protocol address of the client with the optimal servers;
   preparing a presentation description for the content associated with each one of the independent streams, each presentation description including information for the client to establish a media control session for the respective content;
   embedding the presentation descriptions and associated links in the content listing to direct the client to each one of the plurality of optimal servers when the size of the content is above a threshold; and
   providing the content listing to the client.

8. The method of claim 7 wherein each one of the plurality of optimal servers delivers the content to the client in a shorter amount of time as compared to the first server.

9. The method of claim 7 wherein each one of the plurality of optimal servers has a lower network cost as compared to the first server.

10. The method of claim 7 wherein each one of the plurality of optimal servers has a greater capacity to deliver the content to the client as compared to the first server.

11. The method of claim 7 wherein each one of the plurality of optimal servers delivers the first byte of the content to the client in a shorter amount of time as compared to the first server.

12. The method of claim 7 wherein the link is a Universal Resource Locator with a hostname specific to each one of the plurality of optimal servers.

13. The method of claim 12 wherein the hostname includes an address of each one of the plurality of optimal servers.

14. A system, comprising:
   a memory to store instructions; and
   a processor operable to execute instructions to:

receive a request for content from a client at a first server, wherein the content comprises a plurality of independent streams;

determine the size of the content associated with each one of the independent streams;

determine a plurality of optimal servers to provide each one of the independent streams, wherein each server of the plurality of optimal servers is determined as being closer to the client than the first server based upon a table associating an Internet Protocol address of the client with the optimal servers;

prepare a presentation description for the content associated with each one of the independent streams, each presentation description including information for the client to establish a media control session for the respective content;

provide the presentation descriptions to the client; and redirect the client to each one of the optimal servers when the size of the independent stream provided by each one of the optimal servers is above a threshold.

15. The system of claim 14 wherein each one of the plurality of optimal servers has a greater capacity to deliver the content to the client as compared to the first server.

16. The system of claim 14 wherein each one of the plurality of optimal servers delivers a first byte of the content in a shorter amount of time as compared to the first server.

17. The system of claim 14 wherein the threshold is a file size above which redirecting the client to receive the content from each one of the plurality of optimal servers is more efficient than delivering the content from the first server.

* * * * *